United States Patent Office 3,425,840
Patented Feb. 4, 1969

3,425,840
BREAD-FLAVORING ADDITIVE
AND USE THEREOF
Irving Robert Hunter, Berkeley, and Mayo K. Walden, El Cerrito, Calif., assignors to the United States of America as represented by the Secretary of Agriculture
No Drawing. Filed Dec. 9, 1965, Ser. No. 512,807
U.S. Cl. 99—91              10 Claims
Int. Cl. A23l 1/26

ABSTRACT OF THE DISCLOSURE

Proline and an alkane polyol such as glycerine or sorbitol are reacted at 100–150° C. to produce a reaction product which exhibits fresh-bread aroma and which is useful for enhancing the flavor of bakery products.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel flavoring compositions and methods for preparing and utilizing them. Further objects of the invention will be evident from the following description wherein parts and percentages are by weight unless otherwise specified.

In the bread baking industry it is recognized that aroma plays a critical role in the value of the product. Particularly desirable is the appetizing fresh-bread aroma which is prevalent when the product is removed from the oven but which, unfortunately, is rapidly dissipated when the loaves are cooled and stored. Although much work has been done on this subject, no practical success has been achieved. For example, efforts have been made to isolate the flavor components in the vapors issuing from bread ovens, with the idea of returning the isolate to succeeding dough batches. However, these isolations invariably yield products with a stale or insipid odor, which are of no use in flavor-fortifying bread doughs.

In accordance with the invention, proline is reacted with an alkane polyol, preferably glycerol. The reaction product so produced exhibits an intense fresh-bread aroma whereby it may be incorporated in minor proportions into dough to yield bread which exhibits a markedly superior aroma, even after cooling and storage.

Preparation of the flavor-fortifying reaction product is a simple matter, requiring but the heating of proline and glycerol at about 100–150° C. The proportions of the reactants are not critical. Usually, it is preferred to use the glycerol in equal amount or, more desirably, in excess, i.e., about 1 to 10 parts of glycerol per part of proline. Generally, the heating is continued for only a short period, e.g., about 5 to 30 minutes, whereby to get the proline into solution in the glycerol and to effect the reaction only partially. On use of the product—as in the preparation of bread—further reaction will be effected in situ in the loaves by the oven heat. If desired, however, the reaction may initially be conducted for a longer period to attain a greater degree of completion. In such case, means should be provided to prevent loss of the volatile reaction product, as by condensing the vapors of the reaction or by collecting the vapors in an acid—such as hydrochloric, sulphuric, or phosphoric—which forms a non-volatile salt with the product. In a preferred method, the reaction system is continuously flushed with nitrogen (or other gas inert to the product and reactants) and the issuing gas stream is contacted with acid to trap the flavoring principles.

In utilizing the product for enhancing the flavor of bread, it is simply necessary to incorporate it in a conventional dough. The proportion to be used is not critical and may be varied widely, depending on such circumstances as the degree of flavor enhancement desired, the storage life contemplated, the kind of packaging to be applied to the finished loaves, the type of bread, e.g., white, wheat, raisin, other specialties, rolls, etc. In general, a proportion of about 0.1 to 1% of the product, based on the weight of flour in the dough, may be used. In the usual batch-wise system of bread production, the reaction product is preferably added before fermentation when all the other ingredients are mixed together. In the newer continuous system, the reaction product is preferably added when the main portion of the flour is incorporated with the brew.

It is obvious that the reaction product of the invention may be diluted with an edible carrier to facilitate its incorporation into a dough. The carrier may be, for example, sugar, non-fat milk solids, dried whey, flour, corn starch, sorbitol, or the like.

Since the flavoring principles are volatile, if the reaction product is to be stored it should be kept in a sealed container. Another plan to preserve the product involves acidifying it with an acid such as sulphuric, hydrochloric, or phosphoric. The salt formed is essentially non-volatile so that storage thereof will not involve loss by vaporization.

A significant advantage of the reaction product in accordance with the invention is that it not only provides a richer, longer-lasting fresh-bread aroma but also it does not impair the color, texture, or other desirable properties of the load.

For practical purposes in bread production, it is obviously adequate to regard the additive of the invention as a reaction product of proline and glycerol. However, our researchers on this topic provide further insight into its properties and composition. Thus, the active principle of the proline-glycerol reaction product is soluble in both water and in organic solvents such as pentane and hexane. Moreover, it is a nitrogen base and in its base condition exhibits the aforesaid intense fresh-bread aroma whereas when it is formed into a salt as by adding an acid, it is virtually odorless.

In the foregoing description, the use of glycerol as a co-reactant with proline has been stressed. Although glycerol is preferred as being effective and relatively inexpensive, similar results may be obtained by using other alkane polyols in place of glycerol. For example, one may employ such compounds as erythritol, arabitol, xylitol, adonitol, mannitol, dulcitol, or sorbitol. Thus, generically in accordance with the invention, one may use the alkane polyols corresponding to the formula

$$CH_2OH—(CHOH)_n—CH_2OH$$

wherein $n$ is a whole number from 1 to 4. The preparation of the reaction products and use thereof is as described above in connection with glycerol. Where the selected polyol is a solid, it is preferred to add enough water to the starting mixture to obtain a solution of the proline and polyol. It has also been observed that the reaction is promoted by maintaining alkaline conditions in the reaction system. This can readily be achieved by adding a small amount of sodium hydroxide or carbonate to the reaction mixture.

The invention is further demonstrated by the following illustrative examples.

Example I (a) Four grams of proline were stirred into 12 grams of glycerol and the mixture heated for 10 minutes at 110° C. The resulting clear solution was then cooled to room temperature. This solution was used in preparing samples of bread, as described below:

(b) Batches of bread dough were prepared, using the following ingredients:

| Ingredient: | Parts |
|---|---|
| Flour | 100 |
| Water | 61.4 |
| Yeast | 3.0 |
| Salt | 1.5 |
| Sugar | 6.0 |
| Shortening | 1.5 |
| Non-fat dry milk | 4.0 |
| Malted wheat flour | 0.2 |
| Product of part a [1] | 0.5 |

[1] To supply controls, batches of dough were prepared omitting this ingredient.

The ingredients were mixed in the usual way, fermented for 3 hours at 86° F., formed into loaves, proofed 55 minutes at 86° F., and baked for 25 minutes in an oven at 425° F. After cooling, the loaves were wrapped in polyethylene film and held for 24 hours. At the end of this time, the loaves were opened and assayed for organoleptic quality. It was found that the control loaves had a typical bland odor of day-old bread whereas the loaves with the additive had a rich, fresh-bread aroma.

Example II

Proline (100 g.) and glycerol (300 g.) were placed in a reaction vessel and subjected to continuous stirring while held at 120° C. for a period of 24 hours. Concomitantly, nitrogen gas was bubbled through the mixture and the gas stream issuing from the reaction vessel was passed into dilute (10%) aqueous hydrochloric acid. During the operation, the pH of the acid bath was checked from time to time and additional acid was added as required to keep the pH below 2.

After completion of the reaction, the acid bath was neutralized to pH 7.5 by addition of 5% aqueous NaOH. It was noted that upon neutralization, an intense fresh-bread aroma emanated from the material. The neutralized material was extracted five times with pentane, using in each extraction a volume of pentane equal to that of the neutralized material.

The pentane extracts were combined, dried over anhydrous $Na_2SO_4$, and the pentane distilled off until a residue remained having a volume of about 0.5 ml. This product was a highly concentrated form of the fresh-bread aroma principles. It can be used for improving the flavor of bread in the same manner as the reaction product of Example I, with the added advantage that a lesser proportion will be required to effect an equal degree of flavor enhancement.

Example III

Sorbitol (10 g.) and proline (2 g.) were dissolved in 50 ml. of water. Two or three drops of dilute (5%) aqueous NaOH were added, and the solution was boiled for five minutes. It was noted that the solution developed a strong odor of fresh bread. The product could be used as such, or after concentration in the manner disclosed in Example II, for improving the flavor of bread.

Having thus described the invention, what is claimed is:

1. A process for preparing a flavor-fortifying additive for bread which comprises reacting proline and an alkane polyol of the formula—

$$CH_2OH—(CHOH)_n—CH_2OH$$

wherein $n$ is a whole number from 1 to 4, at a temperature of about 100 to 150° C., the reaction being in a system wherein the sole reactants are proline and the alkane polyol.

2. The process of claim 1 wherein the alkane polyol is glycerol.

3. The process of claim 1 wherein the alkane polyol is glycerol and the reaction is continued for a period long enough for the proline to dissolve in the glycerol.

4. The process of claim 1 wherein the alkane polyol is sorbitol.

5. A flavor-fortifying additive for bread which comprises a reaction product of proline and an alkane polyol of the formula—

$$CH_2OH—(CHOH)_n—CH_2OH$$

wherein $n$ is a whole number from 1 to 4, said reaction product being made by reacting proline and the alkane polyol at a temperature of about 100 to 150° C. in a system wherein the sole reactants are proline and the alkane polyol.

6. The product of claim 5 wherein the polyol is glycerol.

7. The product of claim 5 wherein the polyol is sorbitol.

8. A process for preparing bread which comprises incorporating into the dough prior to baking, a reaction product of proline and an alkane polyol of the formula—

$$CH_2OH—(CHOH)_n—CH_2OH$$

wherein $n$ is a whole number from 1 to 4, in an amount sufficient to enhance the flavor of the bread, said reaction product being made by reacting proline and the alkane polyol at a temperature of about 100 to 150° C. in a system wherein the sole reactants are proline and the alkane polyol.

9. The process of claim 8 wherein the polyol is glycerol.

10. The process of claim 8 wherein the polyol is sorbitol.

References Cited

UNITED STATES PATENTS

| 3,304,184 | 2/1967 | Wiseblatt | 99—90 |
| 3,336,138 | 8/1967 | Nakel | 99—91 X |
| 3,336,140 | 8/1967 | Dirks et al. | 99—90 X |

LIONEL M. SHAPIRO, Primary Examiner.

U.S. Cl. X.R.

99—140